March 2, 1965   B. P. BLASINGAME   3,172,023
VARIABLE CAPACITOR
Filed Oct. 8, 1959   2 Sheets-Sheet 1

Benjamin P. Blasingame
INVENTOR

March 2, 1965  B. P. BLASINGAME  3,172,023
VARIABLE CAPACITOR

Filed Oct. 8, 1959  2 Sheets-Sheet 2

Benjamin P. Blasingame  INVENTOR

United States Patent Office 3,172,023
Patented Mar. 2, 1965

3,172,023
VARIABLE CAPACITOR
Benjamin P. Blasingame, Milwaukee, Wis.
(Quarters 4188, U.S. Air Force Academy, Colo.)
Filed Oct. 8, 1959, Ser. No. 845,242
2 Claims. (Cl. 317—249)

This invention relates to variable capacitors which exhibit a sinusoidal variation of capacitance as a function of angular displacement and which are especially useful in capacitive resolvers.

Present day resolvers are electromechanical devices which provide an alternating current signal voltage whose phase differs from that of a reference voltage by an amount precisely equal to the shaft rotation of the resolver. This action is accomplished by means of a four pole stator containing two field windings excited by voltages which are precisely 90° out of electrical phase with respect to each other inside of which a two pole armature containing a single winding is rotated by the resolver shaft. This field arrangement is essentially analogous to that of a two phase induction motor wherein field windings are excited 90° out of electrical phase to produce a rotating magnetic field. The single armature winding of the resolver acts like the secondary of a transformer having induced in it the sum of voltages from both field windings. The voltage induced by each field winding is proportional to the sine of the angle between the axis of the armature and the axis of the field pole. Thus the armature voltage is given by the mathematical expression:

$$e_{out} = n_1 e_1 \sin \omega t \sin \alpha + n_2 e_2 \sin \left(\omega t - \frac{\pi}{2}\right) \sin \left(\alpha - \frac{\pi}{2}\right)$$

where:

$e_{out}$ = armature voltage magnitude
$n_1$ = turns ratio of armature to pole number 1
$e_1$ = voltage magnitude impressed on field number 1
$\omega$ = frequency of excitation voltage in radians/sec.
$t$ = time in seconds
$\alpha$ = angle between axis of armature winding and field pole number 1
$n_2$ = turns ratio of armature to pole number 2
$e_2$ = voltage magnitude impressed on field number 2

Since the armature is rigidly fastened to the resolver shaft, $\alpha$ is also the angle of the resolver shaft with respect to the reference position.

This may be rewritten:

$$e_{out} = n_1 e_1 \sin \omega t \sin \alpha - n_2 e_2 \cos \omega t \cos \alpha \quad (1)$$

If now $n_1$ is made equal to $n_2$ by manufacture and $e_1$ is made equal to $e_2$ by the excitation provisions, then applying the formula $$\cos (x+y) = \cos x \cos y - \sin x \sin y$$

This may be rewritten:

$$e_{out} = n e_{in} \cos (\omega t + \alpha) \quad (2)$$

It is now seen that the output voltage is shifted in electrical phase by exactly the shaft angle, $\alpha$.

A device of this type has many uses in analogue computations, data transmission and general instrumentation applications. The phase shift angle and hence shaft angle may be digitalized by suitable pulse counting systems. Where a shaft position must be measured to extreme precision, gearing is sometimes introduced between the shaft and the resolver. By gearing up the resolver, the phase angle can thus be made to rotate through 360 electrical degrees for some fraction of a complete rotation of the shaft. This introduces an ambiguity in the actual shaft position which must be accounted for by some means such as another "single speed" resolver. Such applications are common in the present instrumentation art.

Two problems in the use of resolvers are the inaccuracy, backlash and expense introduced by gearing resolvers for high accuracy and the electrical and mechanical problems attending the use of slip rings and brushes to connect the armature windings to the resolver terminals. The former problem limits the accuracy of such systems to the accuracy of gear trains and the latter limits the applications to environments which are relatively free of vibration, corrosion, etc.

A principal object of this invention is to provide a variable capacitor with a sinusoidal variation of capacitance as a function of shaft angle and which may be used in single or multi-speed resolvers.

Another object of this invention is to provide an instrument which will provide an output voltage whose electrical phase angle is related to shaft position by some integral multiple without the use of auxiliary gearing and its attendant inaccuracy, cost, and inconvenience.

According to this invention an instrument is provided in which the capacitance varies as a sinusoidal function of rotor displacement. The variable capacitor may be constructed with a single rotor plate and a single stator plate or with a set of connected rotor plates and two sets of stator plates wherein each set of stator plates are excited by a reference voltage so that the two sets are 90 electrical degrees out of phase is so designed that the voltage created across a resistor coupled to the rotor differs from a reference voltage by an electrical phase angle exactly equal to some integral multiple of the rotor shaft angle. The design of the individual capacitor plates is such that the set of stator plates may be disposed in a single plane thereby permitting a single plane rotor so that the capacitor is especially well suited for a capacitive resolver of compact and simple mechanical design. The rotor and stator plates are shaped to correspond to simple mathematical curves to provide a capacity between stators and rotors which is proportional to the sine of the shaft angle. The design of the rotor and stator plates may be made in a multi-leafed pattern according to a simple mathematical formula to provide any desired multiple speed effect. Being a capacitor, the instrument is especially well adapted to very high frequency reference voltage systems. The design of this device lends itself well to precision mass production by chemical etching of a printed pattern of the rotor and stator plate configuration.

Other objects and structural details of this invention will be apparent from the following description when read in connection with the accompanying figures wherein.

Figure 1A:
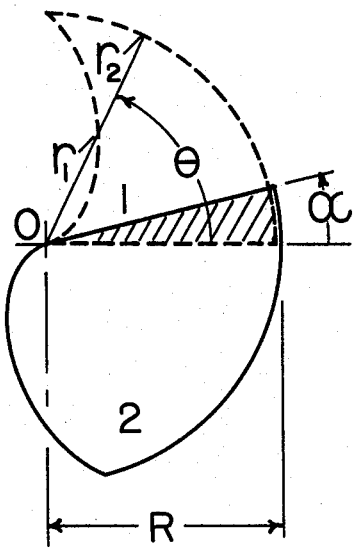
FIGURES 1a and 1b illustrate how the plates of the inventive capacitor are shaped and establishes the mathematical nomenclature for proof that this unique shape produces the desired coupling characteristics.

Referring first to FIGURE 1a, it is seen that a single stator plate 1 is shown by a dotted outline while an associated rotor plate 2 shown by a solid line has been turned from the reference position through the angle α so the area marked by cross hatching is common to both the stator and the rotor. This area of overlap forms a condenser. It is to be noticed that only a single stator plate is shown; in the complete resolver instrument, a minimum of four such plates are necessary. The periphery of both the stator and the rotor plates are circles of radius R and center at the center of rotation marked by the cross mark and O. This point is taken at the origin of the polar coordinate system used to describe mathematically the shaping of rotor and stator of plates and for analyzing the operation of the combination. The curves describing the outline of the stator plate are:

$$r_2 = R$$

$$r_1 = \sqrt{2} R \sin \frac{\theta}{2}$$

where the letters indicate the radial distance to the outlines from the origin along a radial line making an angle $\theta$ with the horizontal line designated as the reference line. The third side of the stator plate is a straight radial line described by the simple equation:

$$\theta = 0$$

The rotor plate is outlined by a radial line, a circle of radius R and a curve identical to that of the stator such that when the rotor has turned through the angle, $\alpha = 180°$, that the area of overlap between the rotor and stator is exactly zero.

The area of overlap between the rotor and the stator and hence the capacity is shown to be proportional to the sine of the shaft angle, $\alpha$. Consider first this area for values of $\alpha$ between zero and ninety degrees. FIGURE 1a illustrates this region particularly well. The area of a curve in polar coordinates is given by the integral:

$$\text{Area} = \frac{1}{2} \int_{\theta_1}^{\theta_2} r^2 d\theta$$

The area of overlap is then:

$$A = \frac{1}{2} \int_0^\alpha r_2^2 d\theta - \frac{1}{2} \int_0^\alpha r_1^2 d\theta$$

$$2A = \int_0^\alpha R^2 d\theta - \int_0^\alpha \left(\sqrt{2} R \sin \frac{\theta}{2}\right)^2 d\theta$$

let $$x = \frac{\theta}{2}; \quad dx = \frac{1}{2} d\theta; \quad d\theta = 2 dx$$

$$\frac{2A}{R^2} = \int_0^\alpha d\theta - 4 \int_0^{\frac{1}{2}\alpha} \sin^2 x \, dx$$

from integral tables:

$$\int \sin^2 x \, dx = \frac{1}{2} x - \frac{1}{4} \sin 2x$$

$$\frac{2A}{R^2} = \theta \Big|_0^\alpha - 2x + \sin 2x \Big|_0^{\frac{1}{2}\alpha}$$

$$= \theta - \theta + \sin \theta \Big|_0^\alpha$$

$$A = \frac{1}{2} R^2 \sin \alpha \qquad (3)$$

Figure 1B:
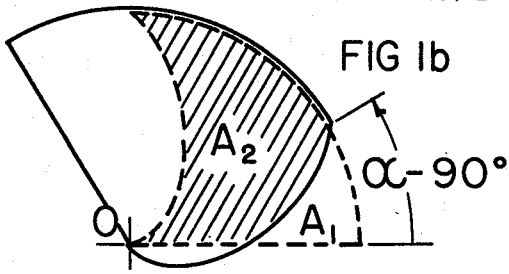

Consider next the area for values of $\alpha$ between ninety and one hundred and eighty degrees. FIGURE 1b illustrates this region. Analogous to the prior calculation, the exposed area of the stator, $A_1$, is readily computed. The remaining area of overlap, $A_2$ is then $\frac{1}{2} R^2 - A_1$.

$$A_1 = \frac{1}{2} \int_0^{\alpha-90} R^2 d\theta - \frac{1}{2} \int_0^{\alpha-90} [\sqrt{2} R \sin \frac{1}{2}(\theta + 180 - \alpha)]^2 d\theta$$

let $$y = \frac{1}{2}(\theta + 180 - \alpha)$$

$$dy = \frac{1}{2} d\theta$$

$$\frac{2A_1}{R^2} = \int_0^{\alpha-90} d\theta - 2 \int_{\frac{1}{2}(180-\alpha)}^{\frac{1}{2}(90)} (\sin y)^2 2 dy$$

$$= \theta \Big|_0^{\alpha-90} - 4(\frac{1}{2} y - \frac{1}{4} \sin 2y) \Big|_{\frac{1}{2}(180-\alpha)}^{\frac{1}{2}(90)}$$

$$= \theta - \theta + 180 - \alpha + \sin(\theta + 180 - \alpha) \Big|_0^{\alpha-90}$$

$$= \sin(\alpha - 90 + 180 - \alpha) - \sin(180 - \alpha)$$

$$= 1 - \sin \alpha$$

$$A_1 = \frac{1}{2} R^2 - \frac{1}{2} R^2 \sin \alpha$$

$$A_2 = \frac{1}{2} R^2 - A_1 = \frac{1}{2} R^2 - \frac{1}{2} R^2 + \frac{1}{2} R^2 \sin \alpha$$

$$A_2 = \frac{1}{2} R^2 \sin \alpha \qquad (4)$$

Equations 3 and 4 demonstrate that the area and hence the capacity of a variable capacitor of this design is proportional to the sine of the shaft angle.

Figure 2:
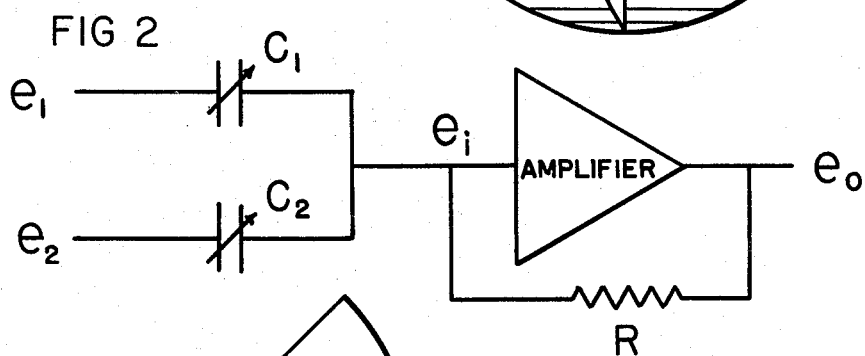
FIGURE 2 illustrates how the capacitor may be used with a preamplifier to provide a voltage proportional to its capacity.

Consider the circuit of FIGURE 2 in which two input voltages, $e_1$ and $e_2$, are connected by means of variable capacitors, $C_1$ and $C_2$, to the input of a high gain amplifier, A, around which a feed back resistor, R, has been connected. Let $e_1$ be the alternating voltage $e \sin \omega t$ and $e_2$ be $$e \sin \left(\omega t - \frac{\pi}{2}\right)$$

the quadrature of $e$. Let the voltage at the input to the amplifier be $e_i$. The input impedance to the amplifier is very large so that essentially no current flows to the amplifier input. The voltage, $e_i$, then, is determined by the current, I flowing through the resistor and the output voltage $e_0$, thus $$e_i = IR + e_0$$
$$I = j\omega C_1(e_1 - e_i) + j\omega C_2(e_2 - e_i)$$

then $$e_i = RC_1 j\omega(e_1 - e_i) + RC_2 j\omega(e_2 - e_i) + e_0$$

but $$e_0 = -K e_i; \quad e_i = -\frac{1}{K} e_0$$

where $-K =$ the gain of the amplifier A then:

$$-\frac{1}{K} e_0 = R C_1 j\omega \left(e_1 + \frac{1}{K} e_0\right) + R C_2 j\omega \left(e_2 + \frac{1}{K} e_0\right) + e_0$$

$$e_0 + K e_0 = KRC_1 j\omega e_1 + RC_1 j\omega e_0 + KRC_2 j\omega e_2 + RC_2 j\omega e_0$$

By making K very large:

$$K e_0 \approx KRC_1 j\omega e_1 + KRC_2 j\omega e_2$$
$$e_0 \approx RC_1 j\omega e_1 + RC_2 j\omega e_2$$

Consider now that the capacitors $C_1$ and $C_2$ are of the design discussed in connection with FIGURE 1 and that they are arranged to be operated by the same shaft and located 90° apart.

Then:

$$e_0 \approx G \sin \alpha \, e_1 + G \sin \left(\alpha - \frac{\pi}{2}\right) e_2$$

where $$G = Rj\omega$$

$$e_0 = Ge \sin \alpha \sin \omega t + Ge \sin \left(\alpha - \frac{\pi}{2}\right) \sin \left(\omega t - \frac{\pi}{2}\right)$$

$$e_0 = Ge(\sin \alpha \sin \omega t + \cos \alpha \cos \omega t)$$

By analogy with equations 1 and 2 this is equivalent to:

$$e_0 = Ge \cos (\omega t + \alpha)$$

Equation 5 shows that the capacitive resolver operated with an amplifier as just described will operate in exactly the same manner as a standard electro-mechanical resolver. It is now shown how stator and rotor designs would appear for a single speed and a two speed capacitive resolver.

Figure 3:
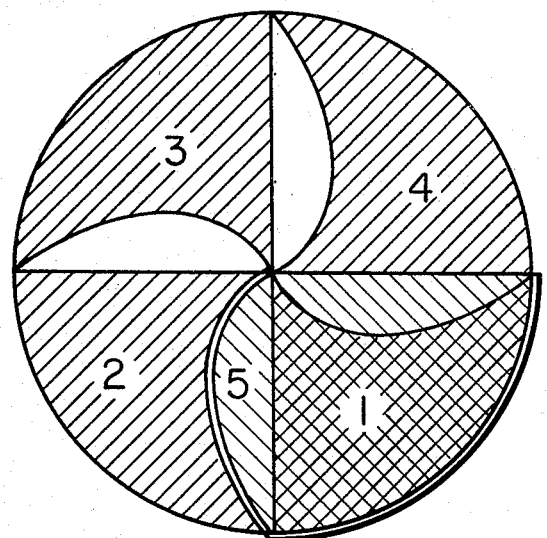
FIGURE 3 illustrates a sort of X-ray view of a single speed capacitive resolver with the rotor in a reference position.

FIGURE 3 illustrates a single speed capacitive resolver with the rotor in the reference position. It is seen that the stator consists of four segments of exactly the same design as studied earlier in connection with FIGURE 1.

Stators 1 and 3 are connected in opposite polarity to the reference voltage. When the rotor passes over stator 1, a voltage in phase with the reference voltage is impressed on the rotor. When the rotor passes over stator 3, a voltage 180° out of phase with this same reference voltage is impressed. This corresponds to the 180° phase shift obtained in a standard resolver when the armature is rotated 180°. The quadrature of the reference voltage is applied to plates 2 and 4 in a like manner. A single rotor plate of the design already described is connected to the amplifier input thus forming the connected sides of $C_1$ and $C_2$ as described in connection with FIGURE 2.

Figure 4:
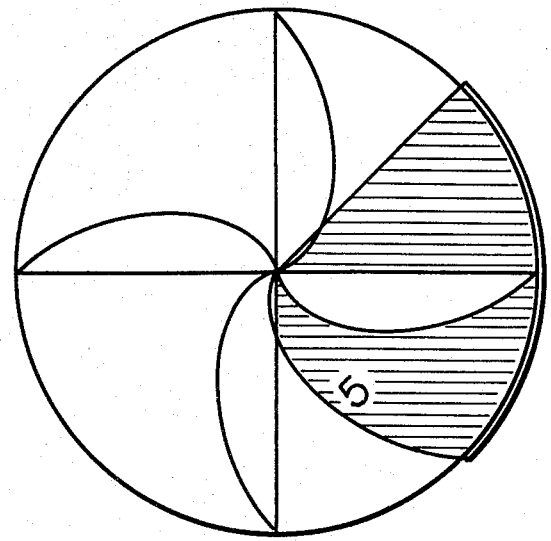
FIGURE 4 illustrates a single speed capacitive resolver with the rotor at some arbitrary angular position.

FIGURE 4 illustrates this same single speed capacitive resolver with the shaft turned through an angle of about 45°.

Figure 5A:
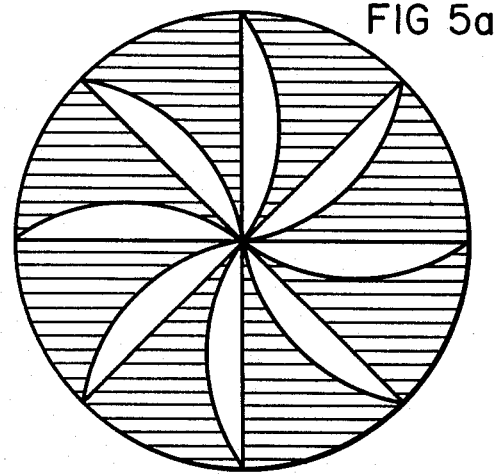
FIGURE 5a illustrates the stator configuration of a two speed capacitive resolver.
Figure 5B:
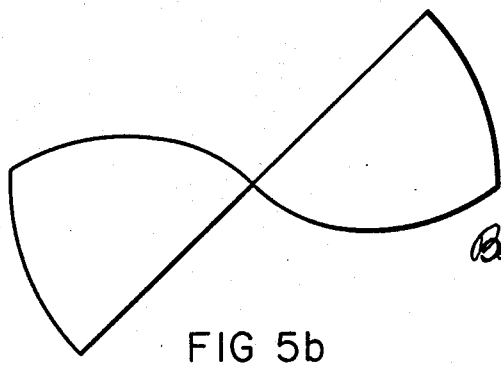
FIGURE 5b illustrates the rotor configuration of a two speed capacitive resolver.

FIGURE 5a shows the stator of a two speed capacitive resolver and FIGURE 5b the rotor to be used with this stator. Here the odd number stators are connected to the reference voltage in phase and out of phase by 180° alternated. The even numbered segments are connected similarly to the quadrature of this reference voltage. The equation of the concave edge of these stator segments is:

$$r = \sqrt{2} \sin \theta$$

Multispeed capacitive resolvers are made by applying the general formula for the concave edge of the stator segments of:

$$r = \sqrt{2}R \sin n\frac{\theta}{2}$$

where $n$ = the "speed" of the capacitive resolver.

The value of $n$ can be made arbitrarily large. Reduction to practice may be accomplished by drawing the design for the rotor and stator parts to a very large scale and then photographically reducing the design. The reduced photograph is then used to print an image on a metallic film laminated to a plastic sheet. By etching the resulting print, the multipolar stators and rotors can be made to great precision.

Thus it is seen that the devices of this invention provide an entirely new and improved variable capacitor especially adapted for single and multispeed resolvers. The multispeed resolver will provide output voltages whose electrical phase angle is related to shaft or rotor position by some integral multiple without the use of auxiliary gearing and its attendant cost, inaccuracy and inconvenience.

While the above description discloses a limited number of embodiments of the device, it is possible to embody the principles of this device in other forms and other applications without departing from the spirit thereof.

In particular the rotor and stator of the variable capacitor may be interchanged, the stator now being fastened to the shaft and the rotor fixed to the case with no departure from the spirit of this invention. Such is a mere mechanical inversion of the invention. It is desired, therefore that only such limitations shall be imposed upon the appended claims as stated therein or required by the prior art.

What is claimed is:

1. A variable capacitor comprising stator and rotor members, the rotor member being spaced from the stator member and supported for rotation about an axis extending through the stator member, one of the members including a flat conductive plate bounded by a straight radial edge extending from the axis, an arcuate peripheral edge having a center on the axis and a concave curved edge extending from the axis to the arcuate peripheral edge, the other of said members including a flat conductive plate bounded by a straight radial edge extending from the axis, an arcuate peripheral edge having a center on the axis and a convex curved edge extending from the axis to the last mentioned peripheral edge, said concave and convex edges being of identical curvature, said rotor having a reference position wherein the straight radial edges of the rotor and stator members are aligned and having a position 180° from the reference position in which said curved edges are aligned whereby the area of overlap of said plates varies in a sinusoidal manner with the displacement of the rotor member from said reference position through an angular displacement of 180°.

2. A variable capacitor comprising stator and rotor members, the rotor member being spaced from the stator member and supported for rotation about an axis extending through the stator member, one of the members including a flat capacitor plate bounded by a straight radial edge of length R extending from said axis, an arcuate peripheral edge of radius R and a concavely curved edge described by the equation $$r = \sqrt{2}R \sin \frac{\theta}{2}$$

wherein $r$ is the radial distance from the axis and $\theta$ is the angle measured from the straight radial edge, the other of the members including a flat capacitor plate bounded by a straight radial edge of length R extending from said axis, an arcuate peripheral edge of radius R and a convexly curved edge described by the equation $$r = \sqrt{2}R \sin \frac{\alpha}{2}$$

wherein $r$ is the radial distance from the axis and $\alpha$ is the angle measured from the last mentioned straight radial edge whereby the area of overlap of said capacitor plates varies sinusoidally with displacement of said rotor.

References Cited in the file of this patent

UNITED STATES PATENTS

| | | |
|---|---|---|
| 1,525,778 | Hellmann | Feb. 10, 1925 |
| 1,566,414 | Meesel | Dec. 22, 1925 |
| 1,681,517 | Clough | Aug. 21, 1928 |
| 1,692,607 | Auli | Nov. 20, 1928 |
| 2,309,068 | Hermansson | Jan. 19, 1943 |
| 2,527,215 | Hahn | Oct. 24, 1950 |
| 2,682,023 | Gray | June 22, 1954 |
| 2,710,941 | Bonnell | June 14, 1955 |
| 2,833,981 | Newell | May 6, 1958 |
| 2,873,415 | Nilsen | Feb. 10, 1959 |
| 2,930,965 | Connor | Mar. 29, 1960 |

FOREIGN PATENTS

| | | |
|---|---|---|
| 826,732 | Great Britain | Jan. 20, 1960 |